(12) United States Patent
Qian

(10) Patent No.: US 9,019,210 B2
(45) Date of Patent: Apr. 28, 2015

(54) INPUT METHOD FOR TOUCH PANEL AND RELATED TOUCH PANEL AND ELECTRONIC DEVICE

(75) Inventor: Jian-Jun Qian, Taipei Hsien (TW)

(73) Assignee: Wistron Corporation, Hsichih, New Taipei (TW)

( * ) Notice: Subject to any disclaimer, the term of this patent is extended or adjusted under 35 U.S.C. 154(b) by 471 days.

(21) Appl. No.: 12/430,898

(22) Filed: Apr. 28, 2009

(65) Prior Publication Data

US 2009/0295745 A1 Dec. 3, 2009

(30) Foreign Application Priority Data

May 29, 2008 (CN) .......................... 2008 1 0111373

(51) Int. Cl.
*G06F 3/041* (2006.01)
*G06F 3/023* (2006.01)
*G06F 3/0488* (2013.01)

(52) U.S. Cl.
CPC .......... *G06F 3/0236* (2013.01); *G06F 3/04886* (2013.01)

(58) Field of Classification Search
CPC .......... G09G 5/08; G06F 3/041; G06F 3/048; G06F 3/0488; G06F 3/0489
USPC ................. 345/156–158, 168, 169, 172–179; 715/800, 801, 808, 815
See application file for complete search history.

(56) References Cited

U.S. PATENT DOCUMENTS

| | | | | |
|---|---|---|---|---|
| 6,169,538 | B1 * | 1/2001 | Nowlan et al. | 345/168 |
| 2006/0161846 | A1 * | 7/2006 | Van Leeuwen | 715/702 |
| 2007/0273662 | A1 * | 11/2007 | Lian et al. | 345/173 |
| 2008/0096610 | A1 * | 4/2008 | Shin et al. | 455/566 |
| 2008/0291171 | A1 * | 11/2008 | Shin et al. | 345/168 |
| 2009/0237373 | A1 * | 9/2009 | Hansson | 345/174 |

FOREIGN PATENT DOCUMENTS

| | | |
|---|---|---|
| JP | 20089759 | 1/2008 |
| JP | 200821094 A | 1/2008 |
| JP | 200877272 A | 4/2008 |
| WO | 2008007848 A2 | 1/2008 |

OTHER PUBLICATIONS

Office action mailed on Apr. 17, 2012 for the Taiwan application No. 097120211, p. 2 line 5-26, p. 3 and p. 4 line 1-9.

* cited by examiner

*Primary Examiner* — Amare Mengistu
*Assistant Examiner* — Stacy Khoo
(74) *Attorney, Agent, or Firm* — Winston Hsu; Scott Margo

(57) ABSTRACT

An input method for a touch panel comprising displaying a plurality of selecting objects each corresponding to a control signal, enlarging a plurality of neighboring selecting objects in the plurality of selecting objects when the plurality of neighboring selecting objects are selected because a first selecting object of the plurality of neighboring selecting objects is not precisely selected, receiving a direction indication signal corresponding to a direction toward the first selecting object of the plurality of neighboring selecting objects from a first position, and outputting a control signal corresponding to the first selecting objects according to the direction indication signal.

15 Claims, 9 Drawing Sheets

INPUT METHOD FOR TOUCH PANEL AND RELATED TOUCH PANEL AND ELECTRONIC DEVICE

BACKGROUND OF THE INVENTION

1. Field of the Invention

The present invention is related to an input method for a touch panel and a related touch panel and electronic device, and more particularly to an input method which can improve input performance for user convenience and related touch panel and electronic device thereof.

2. Description of the Prior Art

Among many electronic devices, like PDA, a touch panel has been widely used as a major input device, and a user can input characters and run programs by simply using a PDA touch pen or the user's finger to select an selecting object on the touch panel. However, there still are some limitations and shortages associated with the touch panel. For example, even though the user can precisely select a selecting object on the touch panel by using a touch pen, in many situations, especially for emergency, there could be no touch pen available for the user, and using finger to select the selecting object on the touch panel could be the most direct and reasonable way to do. In this situation, a touch area of the finger on the touch panel can be too large such that to precisely select the intended selecting object on the touch panel becomes very difficult. Especially when the selecting objects are highly packed on the available display area of the touch panel, an imprecise select action is likely to happen and usually result in incorrect control actions.

One way to solve the problem mentioned above would be to enlarge the size of the touch panel such that the selecting objects on the panel will not get too close together, and the user can select the selecting object with improved precision. However, to enlarge the size of the touch panel will most likely decrease its portability. Another alternative is to enlarge the size of the selecting object on the touch panel, but this method will limit the number of selecting objects to be displayed, or, in some cases, make the arrangement of the selecting objects much less organized.

SUMMARY OF THE INVENTION

It is therefore a primary objective of the claimed invention to provide an input method for a touch panel and the related touch panel and electronic device.

The present invention discloses an input method for a touch panel which comprises displaying a plurality of selecting objects each corresponding to a control signal, enlarging a plurality of neighboring selecting objects in the plurality of selecting objects when the plurality of neighboring selecting objects are selected, receiving a direction indication signal corresponding to a direction toward to a first selecting objects from a first position, and outputting a control signal corresponding to the first selecting objects according to the direction indication signal.

The present invention also discloses a touch panel for an electronic device, which comprises a first display area for displaying a plurality of selecting objects each corresponding to a control signal, a second display area for enlarging a plurality of neighboring selecting objects in the plurality of selecting objects when the plurality of neighboring selecting objects are selected, a sensor unit for receiving a direction indication signal corresponding to a direction toward a first selecting object of the plurality of neighboring selecting objects from a first position; and an output unit for outputting a control signal corresponding to the first selecting objects according to the direction indication signal.

The present invention also discloses a electronic device, which comprises a housing, an operation unit, built inside the housing for performing functions of the electronic device, and a touch panel built upon the housing and coupled to the operation unit for controlling the operation unit, which further comprises a first display area for displaying a plurality of selecting objects, each corresponding to a control signal, a second display area for enlarging a plurality of neighboring selecting objects in the plurality of selecting objects when the plurality of neighboring selecting objects are selected, a sensor unit for receiving a direction indication signal corresponding to a direction toward a first selecting object (of the plurality of neighboring selecting objects) from a first position, and an output unit for outputting a control signal corresponding to the first selecting objects according to the direction indication signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
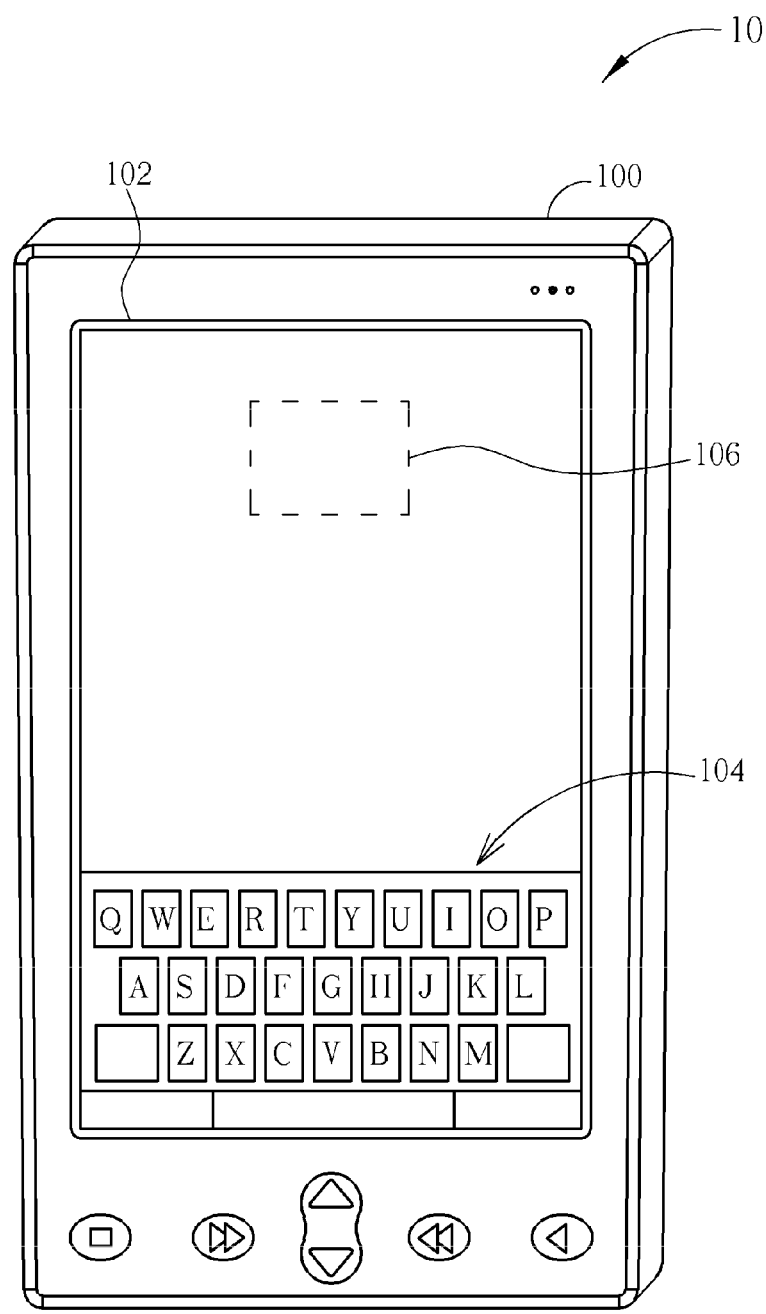
FIG. 1 illustrates a schematic diagram of an electronic device of the embodiment of the present invention.
Figure 9:
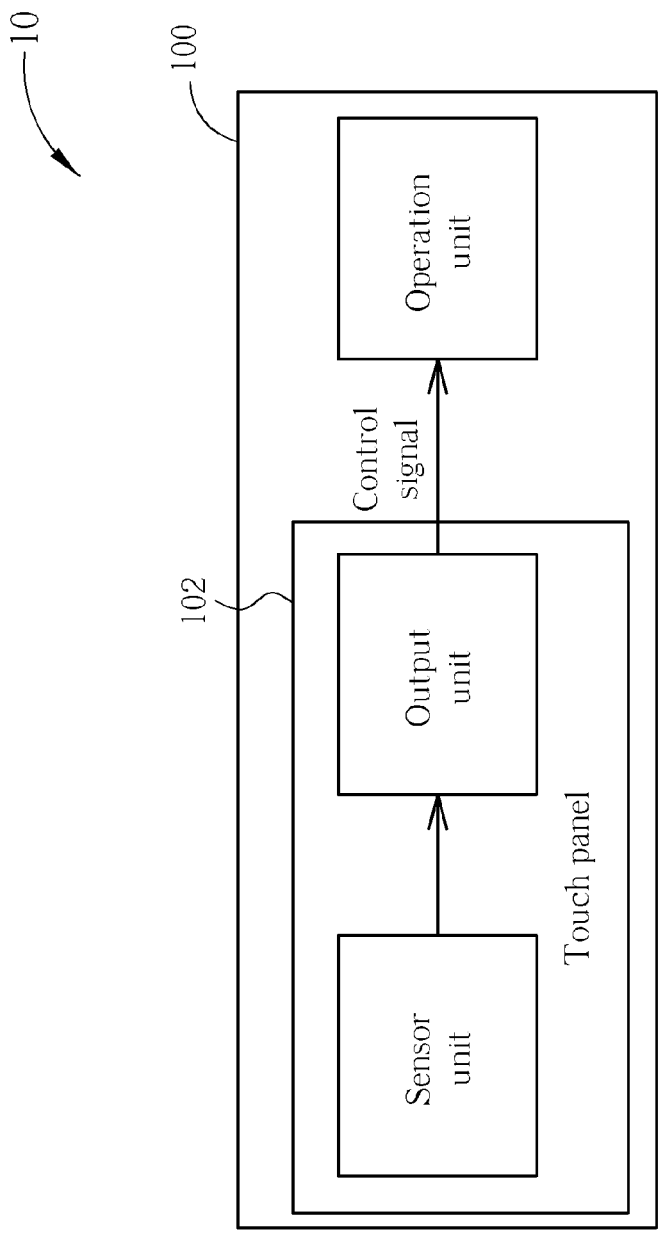
FIG. 9 illustrates a block diagram of the electronic device shown in FIG. 1.

Please refer to FIG. 1, which is a schematic diagram of an electronic device 10 in accordance with an embodiment of the present invention. The electronic device 10 can be a mobile phone, a PDA, and so on, and comprises a housing 100 and a touch panel 102. In the electronic device 10, the touch panel 102 comprises a first display area 104 and a second display area 106. The first display area 104 is used for displaying a plurality of selecting objects, each corresponding to a control signal and preferably forming as a keyboard. The second display area 106 is used for enlarging a plurality of neighboring selecting objects when the plurality of neighboring selecting objects in the first display area 104 are selected. More specifically, please refer to FIG. 9, which is a block diagram of the electronic device 10 shown in FIG. 1. As shown in FIG. 9, the touch panel 102 is utilized for sensing control signals input from a user via a sensor unit, and outputting the control signal to an operation unit inside the electronic device 10 via an output unit, to control the operations of the operation unit.

Figure 2:
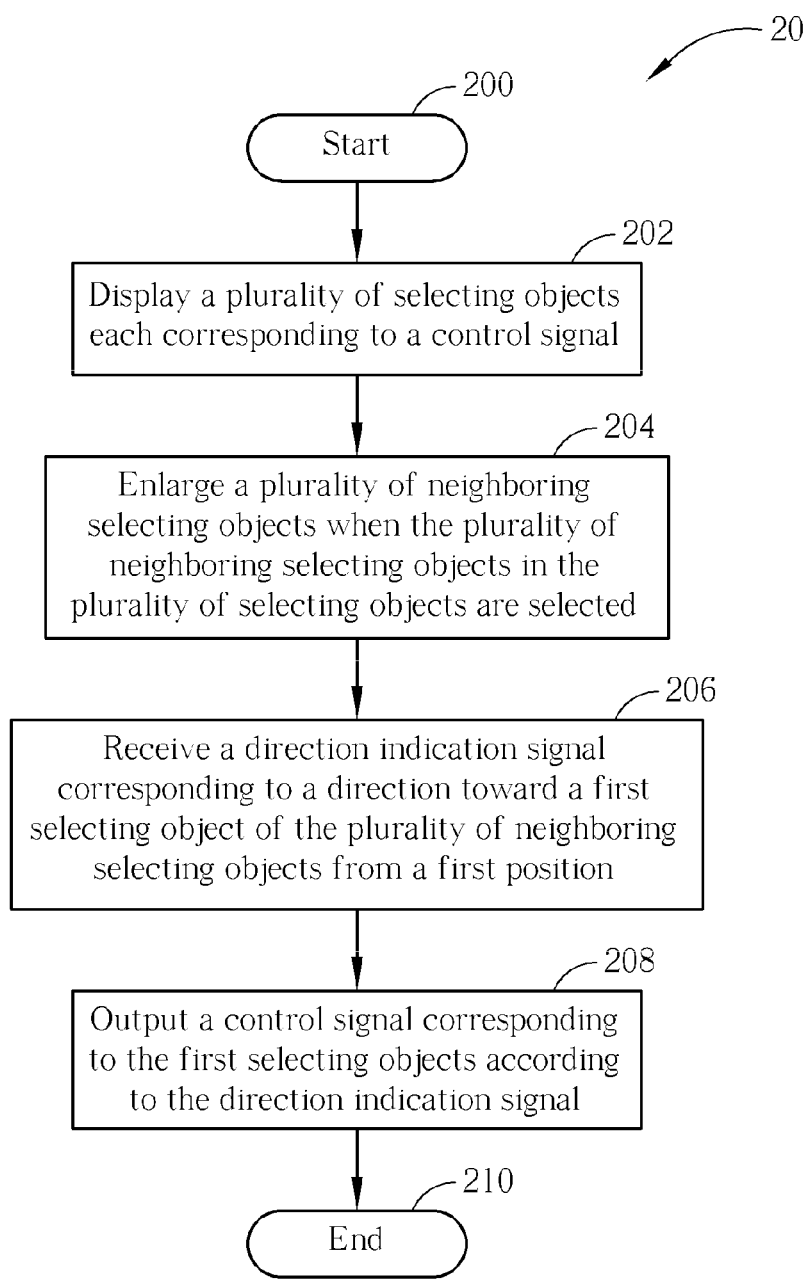
FIG. 2 illustrates a schematic diagram of an input flowchart of the embodiment of the present invention.

Please refer to FIG. 2 for the operation of the electronic device 10. FIG. 2 is a schematic diagram of an input process 20 in accordance with an embodiment of the present invention. The input process 20 comprises the following steps:

Step 200: Start.

Step 202: Display a plurality of selecting objects each corresponding to a control signal.

Step 204: Enlarge a plurality of neighboring selecting objects when the plurality of neighboring selecting objects in the plurality of selecting objects are selected.

Step 206: Receive a direction indication signal corresponding to a direction toward a first selecting object of the plurality of neighboring selecting objects from a first position.

Step 208: Output a control signal corresponding to the first selecting objects according to the direction indication signal.

Step 210: End

According to flowchart 20, firstly, the touch panel 102 displays a plurality of selecting objects via the first display area 104. While a plurality of neighboring selecting objects in the plurality of selecting objects are selected, the second display area 106 would preferably utilize a pop-up display method to enlarge the plurality of neighboring selected objects. Secondly, based on which selecting object the user intends to select, the user may move on the touch panel 102 from a first position (preferably a center of the plurality of neighboring selecting objects) to the selecting object the user intends to select. This movement made by the user will directly result in outputting a direction indication signal, so the touch panel 102 can judge which selecting object is selected, and outputting the corresponding control signal.

Briefly speaking, when the user intends to select a specific selecting object on the touch panel by a finger or an object with relatively large touch area, if the user fails to select with sufficient precision such that some other neighboring selecting objects are also selected simultaneously, the present invention may enlarge all of the selected selecting objects by the pop-up display method. Then, the user may use the object to move on touch panel 102 to select the selecting object intended. In other words, when the user does not precisely select a selecting object, the present invention displays the selected neighborhood by a pop-up display method. The user then makes a movement on the touch panel to indicate the intended selecting object. By this process, the user need not to correct errors induced by imprecise selections, and thus input efficiency can be improved and the present invention advances user's convenience.

Suppose the selecting objects displayed in the first area 104 are corresponding to a keyboard. Firstly, please refer to FIG. 3, the user selects characters W and E simultaneously in the first display area 104. The second display area 106 will pop up the enlarged characters W and E. For the next step, if the user makes a movement to the left on the touch panel 102 in FIG. 3, the present invention will estimate that the user wants to select the character W, and then display and output the character W. On the contrary, if the user makes a movement to the right on the touch panel 102 in FIG. 3, the present invention will estimate that the user wants to select the character E instead of W, and then display and output the character E. By using the present invention, while the user simultaneously selects the characters W and E, the user only needs to make one more movement to the left or right to select between W and E, instead of repeating the selecting process till it is correct.

Figure 3:
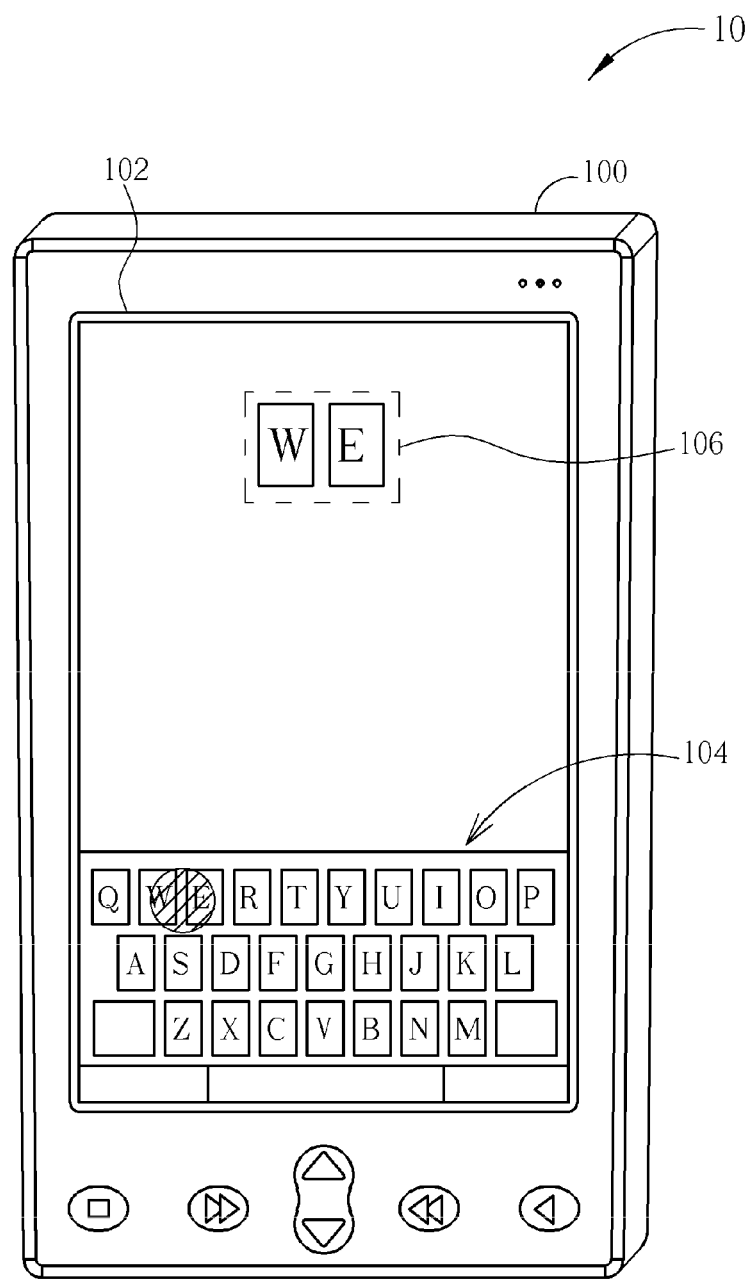
FIG. 3 to FIG. 8 illustrates a schematic diagram the operations of electronic device.
Figure 4:
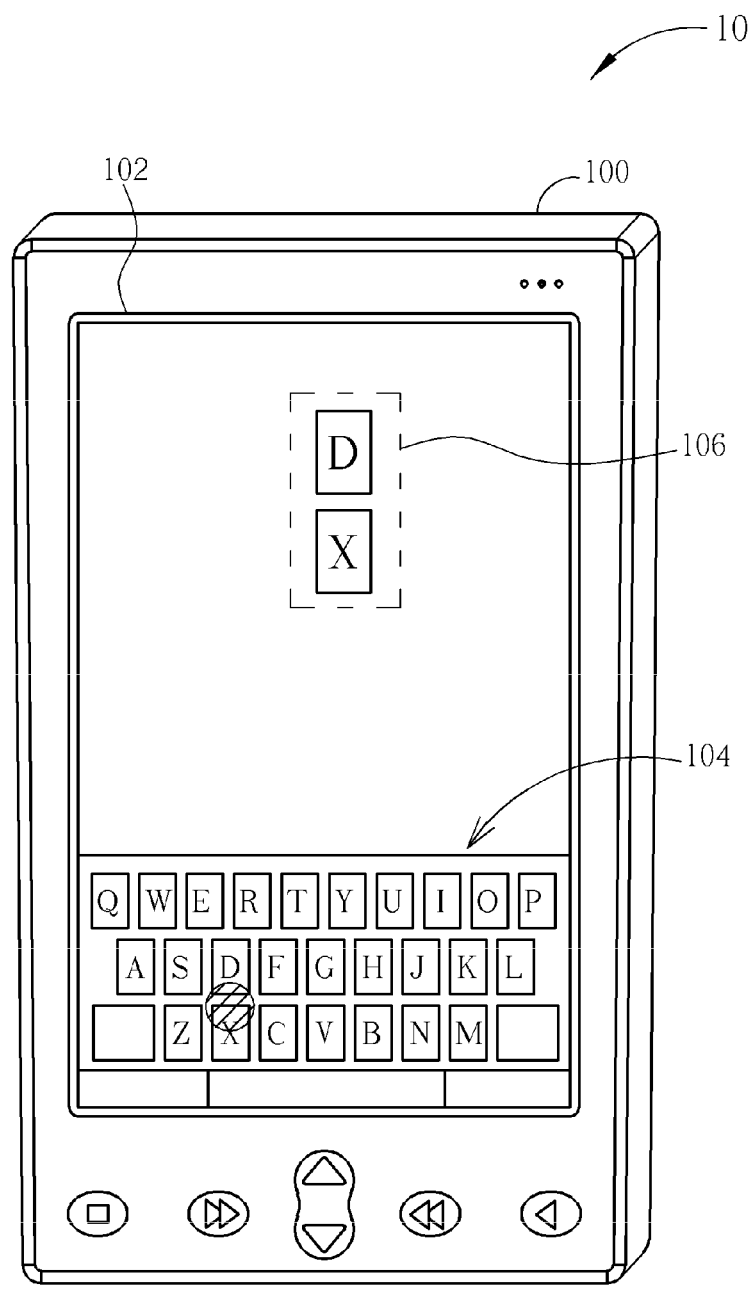

FIG. 3 shows the operations of the touch panel 102 while two neighboring selecting objects in the horizontal direction are being selected simultaneously. Please refer to FIG. 4 for the operations while two neighboring selecting objects in the vertical direction are being selected. In FIG. 4, the user selects characters D and X simultaneously in the first display area 104. The second display area 106 will pop up the enlarged characters D and X. For the next step, if the user moves up on the touch panel 102 in FIG. 4, the present invention will estimate that the user wants to select the character D, and then display and output the character D. Oppositely, if the user moves down on the touch panel 102 in FIG. 4, the present invention will estimate that the user wants to select the character X instead of D, and then display and output the character X. By using the present invention, while the user simultaneously selects the characters D and X, the user only needs to make one more movement to the top or bottom to select between D and X, without redoing the selection all again.

Figure 5:
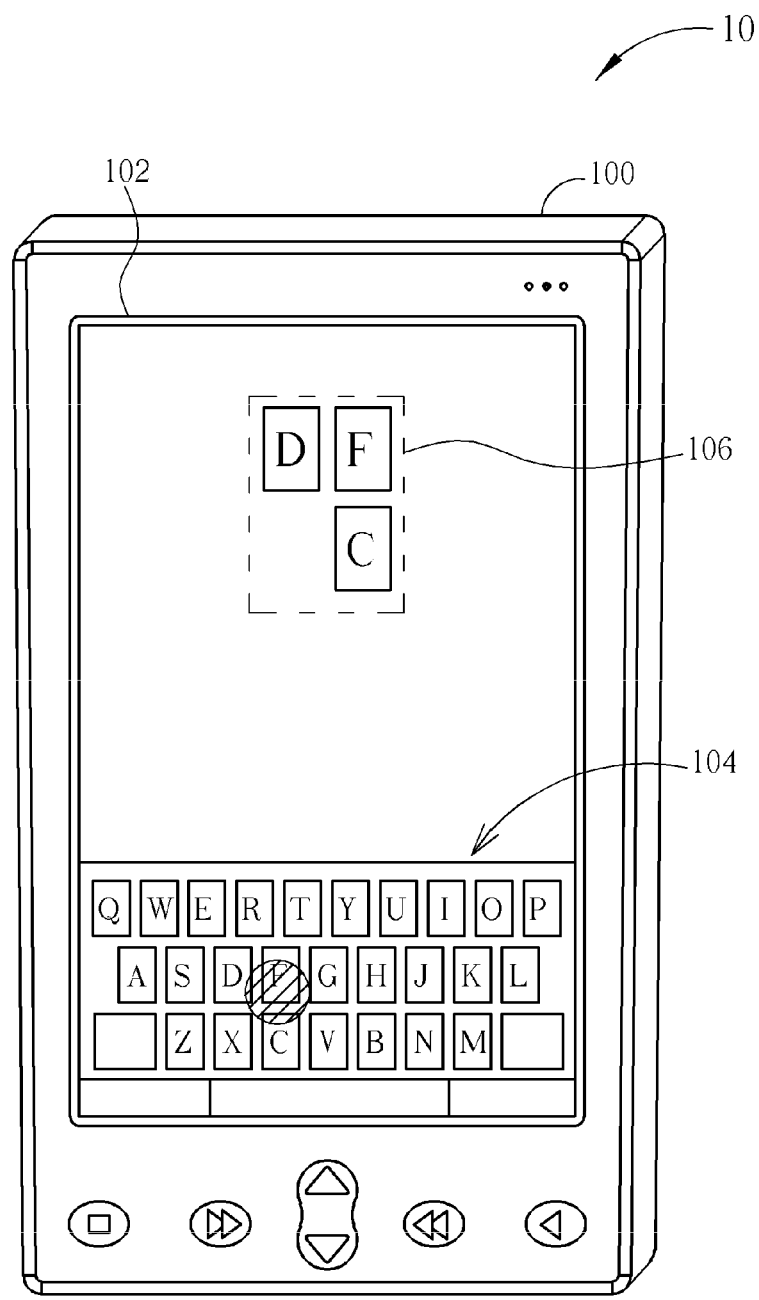
Figure 6:
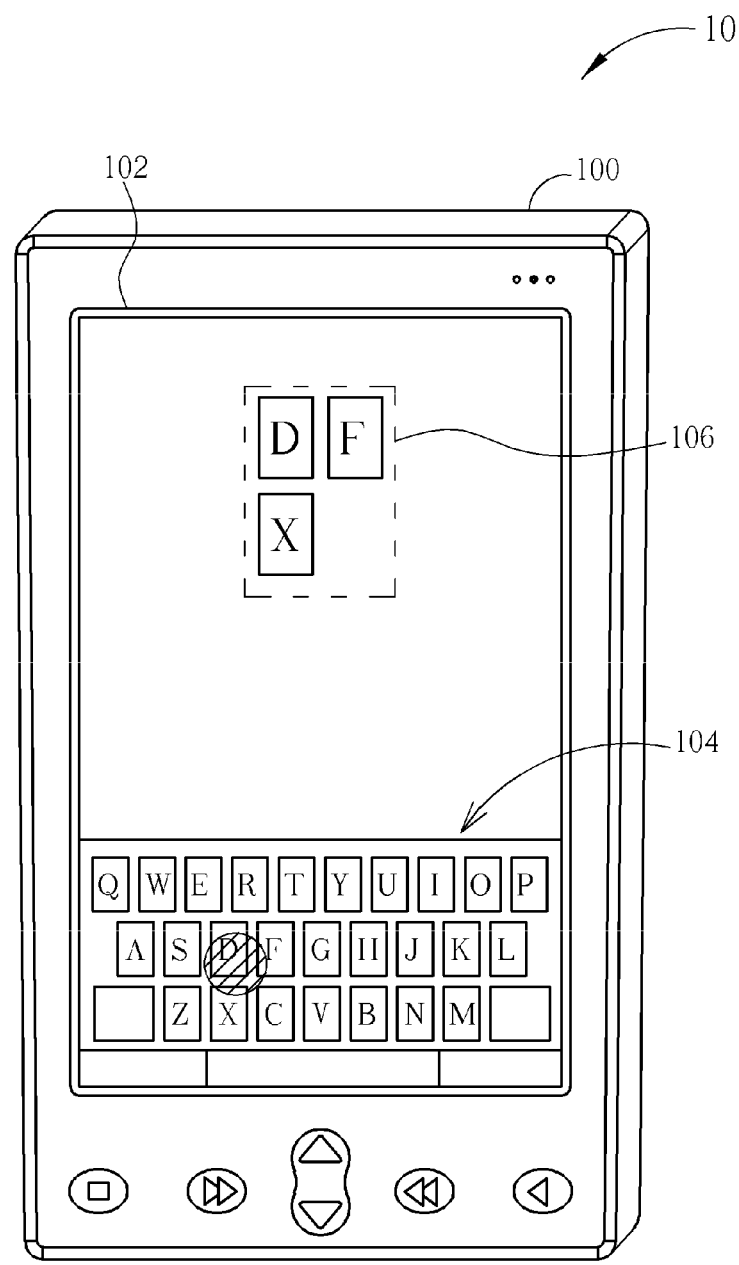
Figure 7:
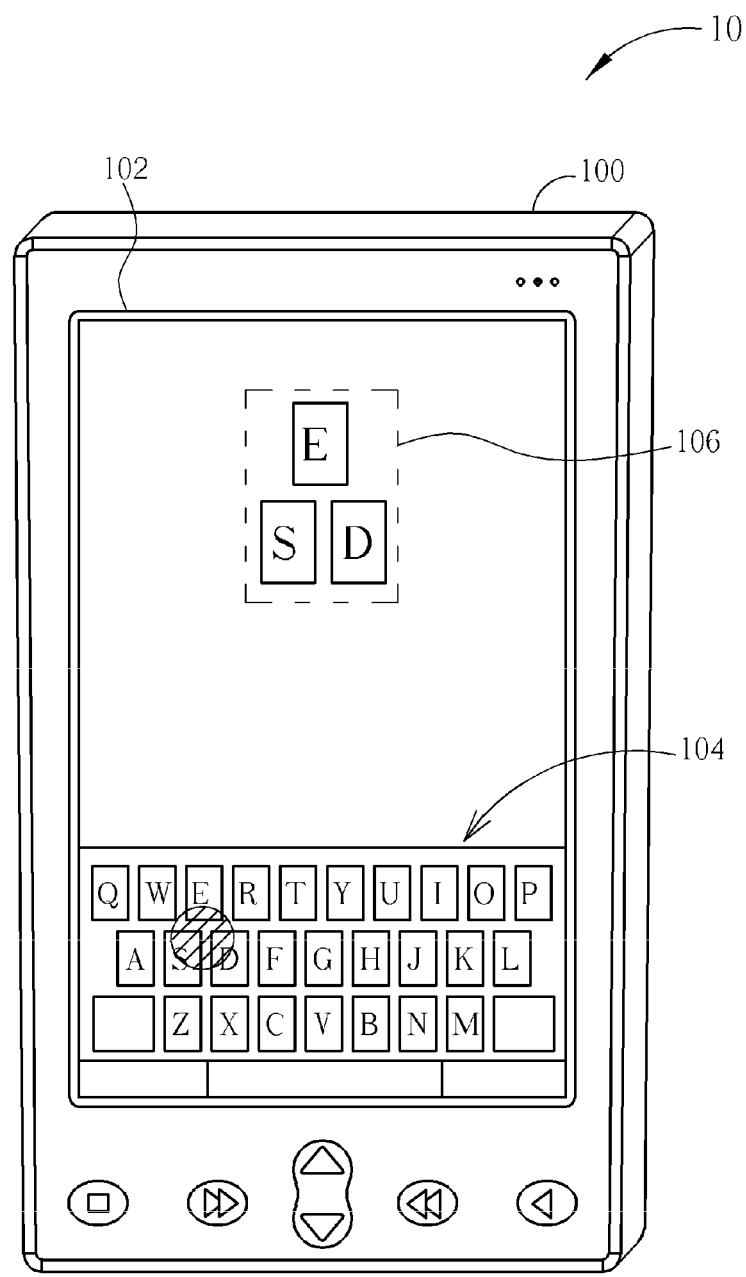

According to the same idea, please refer FIG. 5 to FIG. 7 while three neighboring selecting objects are being selected simultaneously. FIG. 5 shows that the user simultaneously selects characters D, F and C of the keyboard in the first display area 104. The user can move on the touch panel 102 to the left, right or bottom to select one character among D, F and X. Furthermore, FIG. 6 shows that the user simultaneously selects characters D, F and X of the keyboard in the first display area 104. The user can move on the touch panel 102 to the left, right or bottom to select one character among D, F and X. On the other hand, FIG. 7 shows that the user simultaneously selects characters E, S and D of the keyboard in the first display area 104. The user can move on the touch panel 102 to the top, bottom-left or bottom-right to select one character among E, S and D.

Figure 8:
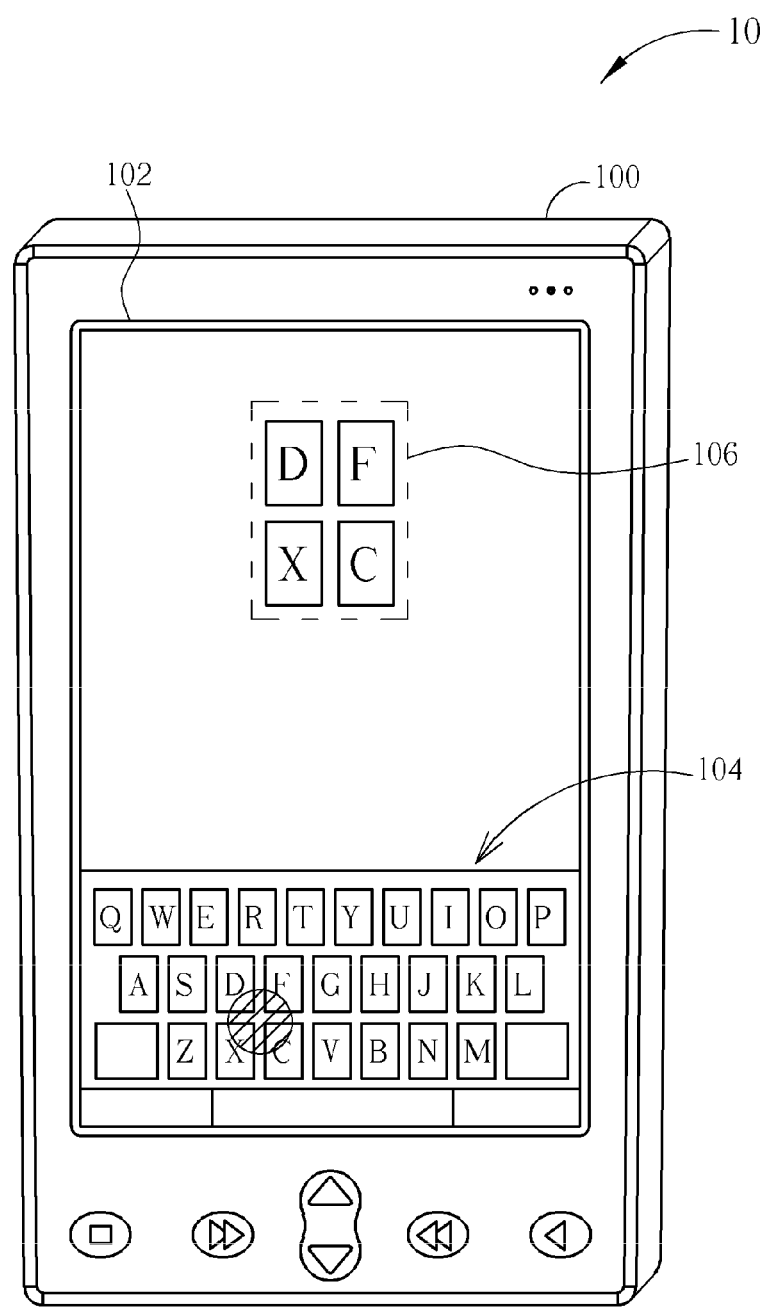

Please refer to FIG. 8 for the operations while four neighboring selecting objects are being selected simultaneously. FIG. 8 shows that the user simultaneously selects characters D, F, X and C of the keyboard in the first display area 104. The user can move on the touch panel 102 to the top-left, top-right, bottom-left or bottom-right to select one character among D, F, X and C.

To summarize, when the user does not precisely select an intended selecting object, the present invention displays the selected neighborhood by the pop-up display method. The user then makes a movement on the touch panel to indicate the intended selecting object. As a result, the user can avoid repeating selecting the wrong selecting objects owing to the limited size of them; therefore, the input efficiency can be improved and the user-friendliness advanced.

Those skilled in the art will readily observe that numerous modifications and alterations of the device and method may be made while retaining the teachings of the invention.

What is claimed is:

1. An input method for a touch panel comprising:
   displaying a plurality of selecting objects each corresponding to a control signal;
   only enlarging a first selecting object and a plurality of neighboring selecting objects selected by a touch event in the plurality of selecting objects by a pop-up display method because the first selecting object is not precisely selected by the touch event and before the touch event is ended, wherein the touch event is caused by an object touching on the touch panel at a first position, and ended by the object leaving the touch panel at a second position;
   receiving a direction indication signal corresponding to a direction toward the second position from the first position, wherein the direction toward the second position from the first position substantially parallels with a direction from a center of a pop-up display toward the enlarged first selecting object within the pop-up display, and the pop-up display is generated by the pop-up display method for only enlarging the first selecting object and the plurality of neighboring selecting objects; and
   outputting a control signal corresponding to the first selecting object according to the direction indication signal, to determine the first selecting object is selected;
   wherein the pop-up display for enlarging the plurality of neighboring selecting objects in the plurality of selecting objects is located other than where the touch event is located.

2. The method of claim 1, wherein the direction indication signal is generated by the situation that the object moves along the direction on the touch panel.

3. The method of claim 2, wherein the object is a finger.

4. The method of claim 1, wherein the first position is a center of the first selecting object and the plurality of neighboring selecting objects.

5. The method of claim 1, wherein the plurality of selecting objects forms a keyboard.

6. A touch panel for an electronic device comprising:
a first display area for displaying a plurality of selecting objects each corresponding to a control signal;
a second display area for only enlarging a first selecting object and a plurality of neighboring selecting objects selected by a touch event in the plurality of selecting objects by a pop-up display method because the first selecting object is not precisely selected by the touch event and before the touch event is ended, wherein the touch event is caused by an object touching on the touch panel, and ended by the object leaving the touch panel;
a sensor unit for receiving a direction indication signal corresponding to a direction toward the second position from the first position, wherein the direction toward the second position from the first position substantially parallels with a direction from a center of a pop-up display toward the enlarged first selecting object within the pop-up display, and the pop-up display is generated by the pop-up display method for only enlarging the first selecting object and the plurality of neighboring selecting objects; and
an output unit for outputting a control signal corresponding to the first selecting object according to the direction indication signal, to determine the first selecting object is selected;
wherein the pop-up display for enlarging the plurality of neighboring selecting objects in the plurality of selecting objects is located other than where the touch event is located.

7. The touch panel of claim 6, wherein the direction indication signal is generated by the situation that the object moves along the direction on the touch panel.

8. The touch panel of claim 7, wherein the object is a finger.

9. The touch panel of claim 6, wherein the first position is a center of the first selecting object and the plurality of neighboring selecting objects.

10. The touch panel of claim 6, wherein the plurality of selecting objects forms a keyboard.

11. An electronic device comprising:
a housing;
an operation unit built inside the housing for performing functions of the electronic device; and
a touch panel built upon the housing and coupled to the operation unit for controlling the operation unit, comprising:
a first display area for displaying a plurality of selecting objects each corresponding to a control signal;
a second display area for only enlarging a first selecting object and a plurality of neighboring selecting objects selected by a touch event in the plurality of selecting objects by a pop-up display method because the first selecting object is not precisely selected by the touch event and before the touch event is ended, wherein the touch event is caused by an object touching on the touch panel, and ended by the object leaving the touch panel;
a sensor unit for receiving a direction indication signal corresponding to a direction toward the second position from the first position, wherein the direction toward the second position from the first position substantially parallels with a direction from a center of a pop-up display toward the enlarged first selecting object within the pop-up display, and the pop-up display is generated by the pop-up display method for only enlarging the first selecting object and the plurality of neighboring selecting objects; and
an output unit for outputting a control signal corresponding to the first selecting object according to the direction indication signal, to determine the first selecting object is selected;
wherein the pop-up display for enlarging the plurality of neighboring selecting objects in the plurality of selecting objects is located other than where the touch event is located.

12. The electronic device of claim 11, wherein the direction indication signal is generated by the situation that the object moves along the direction on the touch panel.

13. The electronic device of claim 12, wherein the object is a finger.

14. The electronic device of claim 11, wherein the first position is a center of the first selecting object and the plurality of neighboring selecting objects.

15. The electronic device of claim 11, wherein the plurality of selecting objects forms a keyboard.

* * * * *